United States Patent
Clark et al.

(10) Patent No.: US 6,409,913 B1
(45) Date of Patent: Jun. 25, 2002

(54) NAPHTHA DESULFURIZATION WITH REDUCED MERCAPTAN FORMATION

(75) Inventors: Janet R. Clark; Michele S. Touvelle; Thomas R. Halbert, all of Baton Rouge, LA (US); Bruce R. Cook, Stewartsville, NJ (US); Garland B. Brignac, Clinton; William C. Baird, Jr., Baton Rouge, both of LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/454,371

(22) Filed: Dec. 3, 1999

Related U.S. Application Data

(63) Continuation-in-part of application No. 08/583,725, filed on Feb. 2, 1996.

(51) Int. Cl.⁷ ............................................. C10G 25/00
(52) U.S. Cl. ........................................................ 208/213
(58) Field of Search ................................. 208/210, 216

(56) References Cited

U.S. PATENT DOCUMENTS

| | | | | |
|---|---|---|---|---|
| 4,131,537 A | * | 12/1978 | Winter et al. | 208/216 |
| 4,132,632 A | * | 1/1979 | Yu et al. | 208/216 |
| 4,140,626 A | * | 2/1979 | Bertolacini et al. | 208/216 R |
| 4,149,965 A | | 4/1979 | Pine et al. | 208/216 R |
| 5,423,975 A | | 6/1995 | Sudhakar et al. | 208/216 R |
| 5,525,211 A | | 6/1996 | Sudhakar et al. | 208/217 |
| 5,906,730 A | | 5/1999 | Hatanaka et al. | 208/210 |
| 6,126,814 A | * | 10/2000 | Lapinski et al. | 208/217 |

\* cited by examiner

*Primary Examiner*—Helane Myers
(74) *Attorney, Agent, or Firm*—Gerard J. Hughes

(57) ABSTRACT

Naphtha desulfurization with reduced product mercaptans is achieved by reacting a naphtha feed containing sulfur compounds and olefins with hydrogen in the presence of a hydrosesulfurization catalyst at reaction conditions including a temperature of from 290–425° C., a pressure of from 60–150 psig, and a hydrogen gas ratio of from 2000–4000 scf/b. It has been found that desulfurizing within these narrow conditions permits deep desulfurization with reduced mercaptan reversion, to produce a naphtha product with low total sulfur and low mercaptan sulfur levels.

28 Claims, No Drawings

NAPHTHA DESULFURIZATION WITH REDUCED MERCAPTAN FORMATION

CROSS-REFERENCE TO RELATED APPLICATION

This application is a continuation-in-part application of co-pending U.S. patent application Ser. No. 08/583,725 filed on Feb. 2, 1996 which was refiled as a Continuing Prosecution Application on Feb. 28, 1998.

BACKGROUND OF THE DISCLOSURE

1. Field of the Invention

The invention relates to a naphtha desulfurization process with reduced formation of reversion mercaptans. More particularly, the invention relates to selectively removing sulfur compounds from an olefin-containing naphtha feed, with reduced reversion mercaptan formation and olefin saturation, by reacting the feed with a hydrogen treat gas in the presence of a hydrodesulfurization catalyst, within specific constraints of high temperature, low pressure and a high treat gas ratio.

2. Background of the Invention

Future mogas sulfur specifications are being regulated through legislation to increasingly lower levels, due to environmental considerations. Sulfur specifications on the order of less than 150 wppm of total sulfur are likely near term, with values of no greater than 30 wppm of total sulfur possible in the not too distant future. Such sulfur specifications are without precedent and will require the production of low sulfur blend stock for the mogas pool. The primary sulfur sources in the mogas pool are the blend stocks derived from FCC naphthas, whose sulfur content can fall in the range of 500–7000 wppm depending upon crude quality and FCC operation. Conventional fixed bed hydrodesulfurization can reduce the sulfur level of FCC naphthas to very low levels, but the severe conditions of temperature, pressure and hydrogen treat gas ratio results in significant octane loss, due to olefin loss from saturation. Selective hydrodesulfurization processes have been developed to reduce olefin saturation and concomitant octane loss. Such processes are disclosed, for example, in U.S. Pat. Nos. 4,149,965; 5,525, 211; 5,423,975, and 5,906,730. However, in these and in other processes, in the hydrodesulfurization reactor the $H_2S$ formed as a consequence of the hydrodesulfurization reacts with the feed olefins, to form mercaptan sulfur compounds, which are known as reversion mercaptans. The amount of these mercaptans formed during the process typically exceeds future fuel specifications for mercaptan sulfur and, in some cases, total sulfur. Accordingly, it is desirable to have a desulfurization process, with reduced mercaptan reversion and octane loss.

SUMMARY OF THE INVENTION

The invention relates to a process for removing sulfur compounds from an olefin-containing naphtha feed, with reduced reversion mercaptan formation, by reacting the feed with a hydrogen treat gas in the presence of a hydrodesulfurization catalyst, within specific constraints of high temperature, low pressure and high treat gas ratio. Thus, the process of the invention comprises reacting a naphtha feed containing organic sulfur compounds and olefins, with a hydrogen treat gas in the presence of a hydrodesulfurization catalyst at a temperature of from 550–425° C., a pressure of from 60–150 psig., and a hydrogen treat gas ratio of from 2000–4000 scf/b, to remove most of the organic sulfur compounds, with reduced olefin saturation. Temperature and pressure ranges of from 340–425° C. and 60–125 psig. are preferred, with from 370–425° C. and 60–100 psig. particularly preferred. Similarly, a preferred treat gas ratio range is from 2500–4000 scf/b, with from 3000–4000 scf/b particularly preferred. From 90–100 wt. % sulfur removal may be achieved to form a desulfurized naphtha product having a total sulfur level of from 5–500 wppm, including from 5–200 wppm of mercaptan sulfur, with a feed olefin loss of from 5–60 wt. %. The catalyst can be any catalyst known to be useful for hydrodesulfurization. Such catalysts typically comprise at least one catalytically active metal component of a metal from Group VIII, on a suitable support. More typically the catalyst will comprise a component of at least one metal of Group VIII and at least one metal of Group VI on a suitable catalyst support, with non-noble Group VIII metals preferred. Low catalytic metal loadings are preferred. Particularly preferred is a low metal loaded catalyst comprising CoO and $MoO_3$ on a support having a Co/Mo atomic ratio of from 0.1 to 1.0, as is explained in detail below. The catalyst may be either fresh, partially deactivated or severely deactivated. The catalyst may be presulfided or it may be sulfided in-situ, using conventional sulfiding procedures. By hydrogen treat gas is meant a gas comprising hydrogen, which may or may not contain one or more diluent gases which don't adversely affect the desulfurization catalyst, process or product. It is preferred that the treat gas comprise from 60–100 vol. % hydrogen. By organic sulfur compound is meant any sulfur bearing organic compound.

Thus, in a broad sense the invention comprises a process for desulfurizing a sulfur and olefin-containing naphtha feed, by reacting the feed with hydrogen, in the presence of a hydrodesulfurizing catalyst, at reaction conditions including a temperature of from 290–425° C., a pressure of from 60–150 psig, and a hydrogen treat gas ratio of from 2000–4000 scf/b. In a more narrow embodiment, the invention comprises a process for desulfurizing a sulfur and olefin-containing naphtha feed with reduced mercaptan formation, by reacting the feed with hydrogen, in the presence of a hydrodesulfurizing catalyst, at reaction conditions including a temperature of from 290–425° C., a pressure of from 60–150 psig, and a hydrogen treat gas ratio of from 2000–4000 scf/b, wherein the catalyst comprises a Mo catalytic component, a Co catalytic component and a support component, with the Mo component being present in an amount of from 1 to 10 wt, % calculated as $MoO_3$ and the Co component being present in an amount of from 0.1 to 5 wt. % calculated as CoO, with a Co/Mo atomic ratio of 0.1 to 1, wherein the naphtha feed contains up to 0.7 wt. % total sulfur and up to 60 wt. % olefins, and wherein the hydrodesulfurization reduces said feed sulfur by at least 90%, with no more than 60% olefin saturation.

DETAILED DESCRIPTION

The selective hydrodesulfurization process of the invention removes organic sulfur compounds, including mercaptan and non-mercaptan sulfur compounds from a naphtha feed, with reduced formation of reversion mercaptans, by conducting the hydrodesulfurization reaction within the specific process constraints of high temperature, low pressure and high treat gas ratio of the invention. While the actual value of any one of these three hydrodesulfurization process constraints of temperature, pressure and hydrogen treat gas ratio used in the process of the invention, may fall within the extremely broad windows of hydrodesulfurization process conditions that one might piece together from a multiplicity of various disclosures, the combination thereof and the unexpected and unique results obtained, have not heretofore been known to be used for naphtha hydroprocessing. It has been found that these three specific operating constraints improve the hydrodesulfurization selectivity, by favoring hydrodesulfurization with less olefin saturation (octane loss). At these selective hydrodesulfurization conditions of high temperature, low pressure and high treat gas ratio, the high concentration of $H_2S$ formed in the hydrodesulfurization reactor, resulting from the deep desulfurization, along with high concentrations of retained feed olefins, would be expected to inherently promote mercaptan reversion. Surprisingly, the opposite has been observed. We have unexpectedly found that, at a given level of retained feed olefins and $H_2S$ formed by the hydrodesulfurization (as found in the effluent of the hydrodesulfurization reactor), significantly less mercaptans are formed by reversion using the process constraints of the invention, than that which occurs at conditions of temperature, pressure and treat gas ratio outside the ranges of the invention. Such conditions outside the constraints of the invention are typically one or more of, a lower temperature, higher pressure and low or lower treat gas ratio. The combination of deep desulfurization of the naphtha feed, along with the relatively high olefin retention and reduced mercaptan formation, achieved with the process of the invention, is therefore unexpected. The Table below illustrates the broad and most preferred narrow ranges of temperature, pressure and treat gas ratio of the invention, in comparison with typical prior art ranges.

| Conditions | The Invention | | Prior Art |
|---|---|---|---|
| | Broad | Narrow | |
| Temp., ° C. | 290–425 | 370–425 | 200–370 |
| Total Press., psig. | 60–150 | 60–100 | 100–2000 |
| Treat gas ratio, scf/b | 2000–4000 | 3000–4000 | 200–10000 |

It is anticipated that environmentally driven regulatory pressure on motor gasoline (mogas) sulfur levels, will result in the widespread production of 30 ppm total sulfur mogas by the year 2004. Further, gas oil and other feeds for a fluid cat cracker used to produce cat cracked naphthas, are increasingly using ever more amounts of poorer quality, high sulfur content components, due to the dwindling supply of higher quality crude oil sources. This results in higher sulfur contents in the cat cracked naphthas, which are the major source of naphtha stocks for mogas pools. Thus, the reduction in mercaptan reversion achieved by the selective hydrodesulfurizing process of the invention, is important with respect to the desulfurized product meeting both low total sulfur and mercaptan sulfur specifications, while preserving the olefins valuable for octane. At such deep levels of desulfurization of from 90–100 wt. % sulfur removal, particularly with relatively high sulfur content naphtha feeds (e.g., >500 wppm and particularly feeds having 1500–7000 wppm sulfur), the contribution of the sulfur from reversion mercaptans, to the total sulfur, can be significant. Therefore, the control of mercaptan formation is necessary to reach these very low sulfur levels of ≦30 wppm.

The organic sulfur compounds in a typical naphtha feed to be desulfurized, comprise mercaptan sulfur compounds (RSH), sulfides (RSR) disulfides (RSSR), thiophenes and other cyclic sulfur compounds, and aromatic single and condensed ring compounds. Mercaptans present in the naphtha feed typically have from one to three ($C_1$–$C_3$) carbon atoms. During the hydrodesulfurization process, the feed mercaptans are removed by reacting with the hydrogen, in the presence of one or more hydrodesulfurization catalysts, and forming $H_2S$ and paraffins. It is believed that the $H_2S$ produced in the reactor from the removal of organic sulfur compounds, reacts with the olefins to form new mercaptans (reversion mercaptans). Generally it has been found that the mercaptans present in the hydrodesulfurized product have a higher carbon number, than those found in the feed. These reversion mercaptans formed in the reactor, and which are present in the desulfurized product, typically comprise $C_{4+}$ mercaptans. Others have proposed reducing the mercaptan and/or total sulfur of the hydrodesulfurized naphtha product by means such as 1) pretreating the feed to saturate diolefins, 2) extractive sweetening of the hydrotreated product, and 3) product sweetening with an oxidant, alkaline base and catalyst. However, diolefin saturation requires an additional reactor vessel and has not been demonstrated as effective for reducing RSH formation. The higher carbon number mercaptans produced by the reversion reactions are difficult to extract into caustic. The third approach suggests sweetening the product by producing disulfides from the mercaptans, and therefore has no value in reducing the total sulfur, as does the process of the invention.

Naphtha feeds or feedstocks useful in the process of the invention include petroleum naphthas, steam cracked naphthas, coker naphthas, FCC naphthas and blends and fractions thereof, with end boiling points typically below 235° C., and which typically contain 60 wt. % or less olefinic hydrocarbons, with sulfur levels as high as 3000 wppm and even higher (e.g., 7000 wppm). The naphtha feed, preferably a cracked naphtha feedstock, generally contains not only paraffins, naphthenes and aromatics, but also unsaturates, such as open-chain and cyclic olefins, dienes and cyclic hydrocarbons with olefinic side chains. A cracked naphtha feed useful in the process of the invention will have an overall olefins concentration ranging from about 5–60 wt. %, preferably from about 10–60 wt. %, and more preferably about 25–50 wt. %. The diene concentration can be as much as 15 wt. %, but more typically ranges from about 0.2 wt. % to about 5 wt. % of the feed. High diene concentrations can result in a gasoline product with poor stability and color. The sulfur content of a cracked naphtha feed will generally range from about 0.05 wt. % to about 0.7 wt. %. In the practice of the invention, it is preferred that the sulfur content range from 0.15–0.7 wt. %, preferably 0.2–0.7 wt. % and more preferably from about 0.3 to 0.7 wt. % (3000–7000 wppm), based on the total weight of the feed. The nitrogen content will generally range from about 5 wppm to about 500 wppm, and more typically from about 20 wppm to about 200 wppm.

Hydrodesulfurization catalysts employed in the process of the invention will comprise at least one catalytically active metal component of a metal from Group VIII on a suitable support. More typically, the catalyst will comprise a catalytic component of a Group VIII metal, and preferably a Group VIII non-noble metal, such as Co, Ni and Fe, in combination with a component of at least one metal selected from Group VIA, IA, IIA, IB metals and mixture thereof, supported on any suitable, high surface area inorganic metal oxide support material such as, but not limited to, alumina, silica, titania, magnesia, silica-alumina, and the like. Alumina, silica and silica-alumina are preferred. As mentioned above, a catalyst comprising a component of at least one metal of Group VIII and at least one metal of Group VI on a suitable catalyst support is preferred, with the Group VI metal being one or more of Group VIA. Preferred Group VIII metals include Co and Ni, with the preferred Group VIA metals comprising Mo and W. A preferred catalyst for the practice of the present invention contains, other than the Group VI and Group VIII metals, up to about 4 wt.%, more preferable from about 0.5 to about 2 wt. % copper, based on the total weight of the catalyst. All Groups of the Periodic Table referred to herein mean Groups as found in the Sargent-Welch Periodic Table of the Elements, copyrighted in 1968 by the Sargent-Welch Scientific Company. Metal concentrations are typically those existing in conventional hydroprocessing catalysts and can range from about 1–30 wt % of the metal oxide, and more typically from about 10–25 wt. % of the oxide of the catalytic metal components, based on the total catalyst weight. As mentioned above, the catalyst may be presulfided or sulfided in-situ, by well known and conventional methods.

A low metal loaded hydrodesulfurization catalyst comprising CoO and $MoO_3$ on a support and having a Co/Mo atomic ratio of from 0.1 to 1.0 is particularly preferred. By low metal loaded is meant that the catalyst will contain not more than 12, preferably not more than 10 and more preferably not more than 8 wt. % catalytic metal components calculated as their oxides, based on the total catalyst weight. Such catalysts include: (a) a $MoO_3$ concentration of about 1 to 10 wt, %, preferably 2 to 8 wt. % and more preferably 4 to 6 wt. % of the total catalyst; (b) a CoO concentration of 0.1 to 5 wt. %, preferably 0.5 to 4 wt. % and more preferably 1 to 3 wt. % based on the total catalyst weight. The catalyst will also have (i) a Co/Mo atomic ratio of 0.1 to 1.0, preferably 0.20 to 0.80 and more preferably 0.25 to 0.72; (ii) a median pore diameter of 60 to 200 Å, preferably from 75 to 175 Å and more preferably 80 to 150 Å; (iii) a MoO surface concentration of $0.5 \times 10^{-4}$ to $3 \times 10^{-4}$ g. $MoO_3/m^2$, preferably $0.75 \times 10^{-4}$ to $2.4 \times 10^{-4}$ and more preferably $1 \times 10^{-4}$ to $2 \times 10^{-4}$, and (iv) an average particle size diameter of less than 2.0 mm, preferably less than 1.6 mm and more preferably less than 1.4 mm. The most preferred catalysts will also have a high degree of metal sulfide edge plane area as measured by the Oxygen Chemisorption Test described in "Structure and Properties of Molybdenum Sulfide: Correlation of $O_2$ Chemisorption with Hydrodesulfurization Activity", S. J. Tauster, et al., J of Catalysis, 63, p. 515–519 (1980), which is incorporated herein by reference. The Oxygen Chemisorption Test involves edge-plane area measurements made wherein pulses of oxygen are added to a carrier gas stream and thus rapidly traverse the catalyst bed. The metal sulfide edge plane area of the catalyst, as measured by the oxygen chemisorption, will be from about 761 to 2800, preferably from 1000 to 2200, and more preferably from 1200 to 2000 µmol oxygen/gram $MoO_3$. Alumina is a preferred support. The supported, low metal loaded Co and Mo containing catalyst used in Example 3 below, met at least the broad ranges of all the catalyst parameters for the low metal loaded catalyst set forth in this paragraph. For catalysts with a high degree of metal sulfide edge plane area, magnesia can also be used. The catalyst support material will preferably contain less than 1 wt. % of contaminants such as Fe, sulfates, silica and various metal oxides which can be present during preparation of the catalyst. It is preferred that the catalyst be free of such contaminants. In one embodiment, the catalyst may also contain from up to 5 wt. %, preferably 0.5 to 4 wt. % and more preferably 1 to 3 wt. % of an additive in the support, which additive is selected from the group consisting of phosphorous and metals or metal oxides of metals of Group IA (alkali metals).

The one or more catalytic metals can be deposited incorporated upon the support by any suitable conventional means, such as by impregnation employing heat-decomposable salts of the Group VIB and VIII metals or other methods known to those skilled in the art, such as ion-exchange, with impregnation methods being preferred. Suitable aqueous impregnation solutions include, but are not limited to a nitrate, ammoniated oxide, formate, acetate and the like. Impregnation of the catalytic metal hydrogenating components can be employed by incipient wetness, impregnation from aqueous or organic media, or compositing. Impregnation as in incipient wetness, with or without drying and calcining after each impregnation, is typically used. Calcination is generally achieved in air at temperatures of from 260–650° C., with temperatures from 260–595° C. typical.

The invention will be further understood with reference to the examples below.

EXAMPLES

Comparative Example A

A fresh, high activity, high metals loaded, laboratory prepared (Co—Mo)/$Al_2O_3$ hydrodesulfurizing catalyst (4 wt. % CoO plus 15 wt. % $MoO_3$) was used to desulfurize a FCC Naphtha (FCCN) feed containing 0.33 wt. % S and 33 vol. % olefins. Table 1 lists the FCCN feed characteristics. The reactor was an isothermal, downflow, all vapor-phase pilot plant reactor, containing 1.25 cc's of catalyst in a 14/35 mesh size. The hydrodesulfurization reaction was carried out with a 100% hydrogen treat gas, at a ratio of 2650 SCF/BBL, 275° C., 305 total psig (234 psig $H_2$ PP), and a liquid hourly space velocity of 5.2 v/v/h. These reaction conditions are outside the scope of the constraints of the invention.

TABLE 1

| Feed Characteristics | |
|---|---|
| Sulfur, wt. % | 0.33 |
| Olefins content, % ASTM D1319 | 32.8 |
| API Gravity | 48.8 |
| Boiling Point by GCD ASTM D2887 | |
| T, ° C. @ 10 wt. % | 77.1 |
| T, ° C. @ 50 wt. % | 125.6 |
| T, ° C. @ 90 wt. % | 173 |

The desulfurization results are shown in Table 2.

Example 1

The same high activity, high metals loaded (Co—Mo)/$Al_2O_3$ catalyst was used to desulfurize the same FCCN feed, with the same experimental equipment and design, as in Comparative Example A (containing 0.33 wt. % S and 33% olefins) but at the reaction conditions within the constraints of the invention. The hydrodesulfurization reaction was carried out with a 100% hydrogen treat gas at a ratio of 2641 SCF/BBL, 288° C., 95.5 total psig (80.5 psig $H_2$ PP), and a liquid hourly space velocity of 5.0, to yield a product with a sulfur level of 432 ppm. The results in Table 2 show that the mercaptan sulfur (RSH) level in the product was only 35.5 ppm, compared to the 84.6 ppm achieved with Comparative Example, and olefin saturation was even slightly less than that for Comparative Example A. The % Bromine reduction is a direct measure of the % feed olefin saturation during the desulfrization.

TABLE 2

Product Qualities

| Temp. & Pres. | % Br # Reduction | % HDS | Total S, wppm | RSH, wppm |
|---|---|---|---|---|
| 274° C., 300 psig. | 17.9 | 87.3 | 420 | 84.6 |
| 288° C., 100 psig. | 15.3 | 86.9 | 432 | 35.5 |

These results demonstrate that the product mercaptan content is very dependent on the hydrodesulfurization reaction conditions. Essentially the same amount of total sulfur hydrodesulfurization was achieved in each case. However, operating under the constraints of the invention, with a temperature of 288° C. and a pressure of 100 psig., produced a desulfurized naphtha product having less than half the mercaptan sulfur content that the same feed desulfurized with the same catalyst, but at a temperature and pressure outside the constraints of the invention. This is surprising, in that operating under the constraints of the invention resulted in a higher olefin content of the desulfurized product, at essentially the same $H_2S$ level exiting the reactor. This would be expected to result in a greater level of reversion mercaptans in the product. However, the mercaptan sulfur content of the desulfurized naphtha product under the conditions of the invention is much lower than that of the naphtha product achieved operating under the prior art conditions.

Even though the hydrodesulfurization conducted under the prior art conditions of Comparative Example A, included a hydrogen treat gas rate within the constraints of the invention, the temperature was 40° C. below the minimum of 288° C. and the pressure was above the 150 psig maximum. This demonstrates the need for having all of the desulfurization reaction conditions within the constraints of the invention, to reduce mercaptan reversion and product mercaptan content, at about the same degree of total desulfurization.

Comparative Example B

The same high activity, high metals loaded (Co—Mo/$Al_2O_3$) catalyst used in the two examples above, but also containing 2 wt. % copper, was used to desulfurize the same FCCN feed (containing 0.33 wt. % S and 33% olefins). The same experimental equipment and design was used as in Example A, except that the catalyst load was 2.4 cc's. The hydrodesulfurization reaction was carried out with a 100% hydrogen treat gas ratio of 2638 SCF/BBL, 273° C., 295 total psig (227 $H_2$ PP), and a LHSV of 7.5, to yield a product with 935 ppm S and a 16% feed olefin saturation. These reaction conditions of temperature and pressure are outside the scope of the constraints of the invention. Of the total product sulfur, 71.8 ppm were mercaptans. The results are shown in Table 3.

Example 2

The same high activity, high metals loaded (Co—Mo/$Al_2O_3$) catalyst containing 2 wt. % copper used in Comparative Example B, was used to desulfurize the same FCCN feed used in the examples above (containing 0.33 wt. % S and 33 % olefins), using the same reactor and catalyst loading as in Comparative Example B, but at reaction conditions within the constraints of the invention. Thus, the hydrodesulfurization reaction was carried out with a 100% hydrogen treat gas at a ratio of 2663 SCF/BBL, 287° C., 104 psig (87 $H_2$ PP), and a LHSV of 3.5, to yield a product with 392 wppm S and a 16.7% reduction in Bromine number. These results are compared with those obtained above by hydrodesulfurizing at prior art conditions, in Table 3.

TABLE 3

Product Qualities

| Temp. & Pres. | % Br # Reduction | % HDS | Total S, wppm | RSH, wppm |
|---|---|---|---|---|
| 274° C., 300 psig. | 16.1 | 71.7 | 935 | 71.8 |
| 288° C., 100 psig. | 16.7 | 88.1 | 392 | 38.5 |

The results in Table 3 are significant in that at the same percent feed Bromine Number reduction, which is indicative of olefin saturation, significantly more total hydrodesulfurization was obtained under the constraints of the invention. The Example 2 environment, where more $H_2S$ is present with the same amount of olefins in the reactor (Example 2 vs. Comparative Example B), would be expected to produce more mercaptans from reversion. Instead, less mercaptans were formed under the conditions of the invention and this is unexpected.

Comparative Example C

A laboratory prepared, fresh batch of a low metal loaded, high dispersion catalyst in a 1.3 mm ASQ form, consisting of approximately 6.5 wt. % $MoO_3$ and 2.2 wt. % CoO on an alumina support, was used in this experiment and in the experiment below. The feed was a heavy cat naphtha feed, containing, 2813 wppm total sulfur, and 29.5 bromine number and the hydrodesulfurization reactor was an isothermal, downflow, all vapor-phase pilot plant reactor. Catalyst loading was 20 cc. The hydrodesulfurization reaction conditions used in this experiment were 260.5° C., a 100% hydrogen treat gas ratio of 2596 scf/b and a 300 psig total inlet pressure. The feed space velocity was 6.57 LHSV. Thus, the desulfurization reaction conditions of temperature and pressure were outside the scope of the constraints of the invention. Overall sulfur removal was 88.1 wt. % and feed olefin saturation of 25.4%. Table 4 compares these results with results for the same catalyst, feed and reactor, but operating within the reaction conditions of the invention.

Example 3

This experiment was similar to Comparative Example C, using the same catalyst, feed and reactor, etc., except for the hydrodesulfurization reaction conditions, which were within the scope of those of the invention. These conditions included a temperature of 288° C., a 100% hydrogen treat gas at a ratio of 2629, scf/b and a 116 psig total reactor inlet pressure. The results are set forth in Table 4, in which they can be readily compared with those obtained from Comparative Example C above.

TABLE 4

| Reaction Conditions | % HDS | % Bromine # Reduction | RSH, wppm |
|---|---|---|---|
| Prior art (260.5° C., 306 psig) Comparative Example C | 88.1 | 25.4 | 63 |
| The invention (288° C., 116 psig) Example 3 | 90.3 | 23.7 | 15.7 |

The results again demonstrate the efficacy of the process of the invention for reducing product mercaptan levels at the same degree of desulfurization. In this case, feed olefin saturation was significantly less with the invention, than with the prior art conditions.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertain.

What is claimed is:

1. A process for desulfurizing a sulfur and olefin-containing naphtha feed while inhibiting mercaptan formation, comprising reacting said feed with hydrogen, in the presence of a hydrodesulfurizing catalyst where in said catalyst comprises at least one Group VIII catalytic metal component and a catalyst support component and at least one Group VI Catalytic metal at reaction conditions including a temperature of from 290–425° C., a pressure of from 60–150 psig, and a hydrogen treat gas ratio of from 2000–4000 scf/b.

2. A process according to claim 1 wherein said catalytic metal components, calculated as the metal oxides, are present in said catalyst in an amount of from 1–30 wt. %, based on the total catalyst weight.

3. A process according to claim 2 wherein said catalyst also contains up to about 4 wt. % copper.

4. A process according to claim 3 wherein the amount of copper present is from about 0.5 to 2 wt. %.

5. A process according to claim 4 wherein said naphtha feed contains from 5 to 60 wt. % olefins and up to 0.7 wt. % total sulfur.

6. A process according to claim 5 wherein said total feed sulfur ranges from 0.15 wt. % up to 0.7 wt. %.

7. A process according to claim 6 wherein at least 90 wt. % of said total feed sulfur is removed during said hydrodesulfurization.

8. A process according to claim 7 wherein said feed contains from 5 to 60 wt. % olefins and wherein no greater than 60 wt. % of said feed olefins are saturated during said hydrodesulfurization.

9. A process according to claim 8 wherein said reaction conditions include a temperature of from 370–425° C., a pressure of from 60–125 psig, and a hydrogen treat gas ratio of from 2500–4000 scf/b.

10. A process according to claim 9 wherein said Group VIB catalytic metal component includes a component of at least one of at least one of Mo and W and wherein said Group VIII catalytic metal component includes at least one of Co and Ni.

11. A process according to claim 10 wherein said naphtha feed contains from 10–60 wt. % olefins, of which no more than 50% are saturated during said hydrodesulfurization.

12. A process according to claim 11 wherein said total feed sulfur ranges from 0.2–0.7 wt. %.

13. A process according to claim 12 wherein said naphtha feed contains from 25–60 wt. % olefins, of which no more than 50% are saturated during said hydrodesulfurization.

14. A process according to claim 13 wherein said total feed sulfur ranges from 0.2–0.7 wt. %.

15. A process according to claim 14 wherein at least 95 wt. % of said total feed sulfur is removed during said hydrodesulfurization.

16. A process according to claim 15 wherein said reaction conditions include a temperature of from 370–425° C., a pressure of from 60–100 psig, and a hydrogen treat gas ratio of from 3000–4000 scf/b.

17. A process according to claim 16 wherein said feed contains at least 0.3 wt. % sulfur and wherein no more that 30 wt. % of said feed olefins are saturated during said hydrodesulfurization.

18. A process for desulfurizing a sulfur and olefin-containing naphtha feed with reduced mercaptan formation, comprises reacting said feed with hydrogen, in the presence of a hydrodesulfurizing catalyst, at reaction conditions including a temperature of from 290–425° C., a pressure of from 60–150 psig, and a hydrogen treat gas ratio of from 2000–4000 scf/b, wherein said catalyst comprises a Mo catalytic component, a Co catalytic component and a support component, with said Mo component being present in an amount of from 1 to 10 wt, % calculated as $MoO_3$ and said Co component being present in an amount of from 0.1 to 5 wt. % calculated as CoO, with a Co/Mo atomic ratio of 0.1 to 1, wherein said naphtha feed contains up to 0.7 wt. % total sulfur and up to 60 wt. % olefins, and wherein said hydrodesulfurization reduces said feed sulfur by at least 90%, with no more than 60% olefin saturation.

19. A process according to claim 18 wherein the total amount of said Mo and Co catalytic components, calculated as $MoO_3$ and CoO is no greater than 12 wt. % of said catalyst.

20. A process according to claim 19 wherein the total amount of said catalytic components is no greater than 10 wt. % of said catalyst, wherein the concentration of said Mo component, calculated as $MoO_3$ ranges from 2–8 wt. % of said catalyst and the concentration of said Co component calculated as CoO ranges from 0.5–4 wt. %.

21. A process according to claim 20 wherein said feed contains at least 10 wt. % olefins and at least 0.2 wt. % total sulfur and wherein less than 50% of said feed olefins are saturated.

22. A process according to claim 21 wherein the total amount of said catalytic components is no greater than 8 wt. % of said catalyst, wherein the concentration of said Mo component, calculated as $MoO_3$ ranges from 4–6 wt. % of said catalyst and the concentration of said Co component calculated as CoO ranges from 1–3 wt. %.

23. A process according to claim 22 wherein wherein said reaction conditions include a temperature of from 370–425° C., a pressure of from 60–125 psig, and a hydrogen treat gas ratio of from 2500–4000 scf/b.

24. A process according to claim 23 wherein said feed contains at least 25 wt. % olefins and at least 0.3 wt. % total sulfur and wherein less than 30% of said feed olefins are saturated.

25. A process according to claim 24 wherein said reaction conditions include a temperature of from 370–425° C., a pressure of from 60–100 psig, and a hydrogen treat gas ratio of from 3000–4000 scf/b.

26. A process according to claim 25, wherein said catalyst support component comprises alumina.

27. A process according to claim 1 wherein said catalyst also contains up to about 4 wt. % copper.

28. A process according to claim 27 wherein said catalyst also contains from about 0.5 to 2 wt. % copper.

* * * * *